(12) United States Patent
Courchaine et al.

(10) Patent No.: US 10,845,542 B1
(45) Date of Patent: Nov. 24, 2020

(54) CABLE NODE TRANSITION ASSEMBLIES

(71) Applicant: AFL Telecommunications LLC, Duncan, SC (US)

(72) Inventors: Wilfred J. Courchaine, Moore, SC (US); William Miller, Easley, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/544,273

(22) Filed: Aug. 19, 2019

(51) Int. Cl.
G02B 6/26 (2006.01)
G02B 6/44 (2006.01)

(52) U.S. Cl.
CPC ............ G02B 6/26 (2013.01); G02B 6/4429 (2013.01); G02B 6/4477 (2013.01)

(58) Field of Classification Search
None
See application file for complete search history.

(56) References Cited

U.S. PATENT DOCUMENTS

| | | | |
|---|---|---|---|
| 5,329,603 | A | 7/1994 | Watanabe |
| 5,347,603 | A | 9/1994 | Belenkiy |
| 5,390,272 | A | 2/1995 | Repta |
| 5,425,120 | A | 6/1995 | Peterson et al. |
| 6,134,370 | A | 10/2000 | Childers et al. |
| 6,429,373 | B1 | 8/2002 | Scrimpshire et al. |
| 6,565,262 | B2 | 5/2003 | Childers et al. |
| 6,601,997 | B2 | 8/2003 | Ngo |
| 6,629,783 | B2 | 10/2003 | Ngo |
| 6,672,774 | B2 | 1/2004 | Theuerkorn et al. |
| 6,754,430 | B1 | 6/2004 | Kuehne |
| 6,817,780 | B2 | 11/2004 | Ngo |
| 6,959,139 | B2 | 10/2005 | Erwin et al. |
| 7,001,061 | B2 | 2/2006 | Cox et al. |
| 7,146,090 | B2 | 12/2006 | Vo et al. |
| 7,407,331 | B2 | 8/2008 | Momotsu et al. |
| 7,677,812 | B2 | 3/2010 | Castagna et al. |
| 7,682,088 | B2 | 3/2010 | Nielson et al. |
| 7,695,197 | B2 | 4/2010 | Gurreri |
| 7,758,257 | B2 | 7/2010 | Anderson et al. |

(Continued)

FOREIGN PATENT DOCUMENTS

| | | |
|---|---|---|
| CN | 101248382 B | 11/2010 |
| CN | 102057308 B | 1/2013 |

(Continued)

Primary Examiner — Chad H Smith
(74) Attorney, Agent, or Firm — Dority & Manning, P.A.

(57) ABSTRACT

Cable node transition assemblies are provided. A cable node transition assembly includes an outer nut extending along a longitudinal axis between a first end and a second end, the outer nut including an outer thread at the second end. The cable node transition assembly further includes a fiber optic cable. The cable node transition assembly further includes a cable positioning assembly connected to the outer nut and extending from the first end of the outer nut. A portion of the cable is disposed within the cable positioning assembly. The cable positioning assembly is operable to alternately fix the cable in a first position and a second position. In the first position the portion of the cable disposed within the cable positioning assembly extends along the longitudinal axis. In the second position the portion of the cable disposed within the cable positioning assembly extends away from the longitudinal axis.

17 Claims, 5 Drawing Sheets

(56) References Cited

U.S. PATENT DOCUMENTS

| | | | |
|---|---|---|---|
| 8,170,391 B2 | 5/2012 | Beck | |
| 8,672,705 B2 | 3/2014 | Schneider | |
| 8,702,323 B2 | 4/2014 | Nhep | |
| 8,734,175 B2 | 5/2014 | Ayers | |
| 8,873,926 B2 | 10/2014 | Beamon et al. | |
| 8,876,407 B2 | 11/2014 | Grinderslev | |
| 9,016,954 B2 | 4/2015 | Lin | |
| 9,103,995 B2 | 8/2015 | Park et al. | |
| 9,110,250 B2 | 8/2015 | Lin | |
| 9,213,145 B2 | 12/2015 | Droesbeke et al. | |
| 9,235,010 B2 | 1/2016 | Islam | |
| 9,270,048 B2 | 2/2016 | Harwath et al. | |
| 9,389,370 B2 | 7/2016 | Pratt et al. | |
| 9,419,375 B2 | 8/2016 | Dieduksman et al. | |
| 9,429,732 B2 | 8/2016 | Ahmed et al. | |
| 9,448,366 B2 | 9/2016 | Lichoulas et al. | |
| 9,551,842 B2 | 1/2017 | Theuerkorn | |
| 9,720,198 B2 | 8/2017 | Kuffel et al. | |
| 9,810,856 B2 | 11/2017 | Graham et al. | |
| 9,857,540 B2 | 1/2018 | Ahrned et al. | |
| 9,989,711 B2 | 6/2018 | Ott et al. | |
| 10,261,268 B2 | 4/2019 | Theuerkorn | |
| 10,401,578 B2 | 9/2019 | Coenegracht | |
| 10,539,745 B2 | 1/2020 | Kamada et al. | |
| 2003/0039453 A1* | 2/2003 | Holmquist | G02B 6/3887 385/86 |
| 2004/0121646 A1 | 6/2004 | Imartino et al. | |
| 2005/0281510 A1* | 12/2005 | Vo | G02B 6/3887 385/60 |
| 2015/0153516 A1* | 6/2015 | Lin | G02B 6/3825 385/134 |
| 2015/0346435 A1 | 12/2015 | Kato | |
| 2019/0285808 A1 | 9/2019 | Lee et al. | |
| 2019/0293892 A1 | 9/2019 | Wentworth et al. | |
| 2019/0310430 A1 | 10/2019 | Nguyen et al. | |
| 2019/0339475 A1 | 11/2019 | Takano et al. | |
| 2019/0341729 A1 | 11/2019 | Gniadek | |
| 2019/0369336 A1 | 12/2019 | Van Baelen et al. | |
| 2020/0064558 A1 | 2/2020 | Crawford | |
| 2020/0064561 A1 | 2/2020 | Alrutz | |
| 2020/0073059 A1 | 3/2020 | Takeuchi et al. | |
| 2020/0096709 A1 | 3/2020 | Rosson | |
| 2020/0103598 A1 | 4/2020 | Davidson et al. | |
| 2020/0110228 A1 | 4/2020 | Wong et al. | |
| 2020/0116937 A1 | 4/2020 | Nhep et al. | |
| 2020/0124801 A1 | 4/2020 | Chabot et al. | |

FOREIGN PATENT DOCUMENTS

| | | |
|---|---|---|
| CN | 203813392 U | 9/2014 |
| CN | 203838368 U | 9/2014 |
| CN | 203981923 U | 12/2014 |
| CN | 204116648 U | 1/2015 |
| CN | 204116649 U | 1/2015 |
| CN | 204575900 U | 8/2015 |
| CN | 204694901 U | 10/2015 |
| CN | 103703397 B | 2/2016 |
| CN | 105322347 A | 2/2016 |
| CN | 104698547 B | 4/2016 |
| CN | 102195195 B | 8/2016 |
| CN | 205826910 U | 12/2016 |
| CN | 105190387 B | 1/2017 |
| CN | 104508930 B | 5/2017 |
| CN | 206649198 U | 11/2017 |
| CN | 207039156 U | 2/2018 |
| CN | 107861205 A | 3/2018 |
| CN | 107884878 A | 4/2018 |
| CN | 207650446 U | 7/2018 |
| CN | 207650448 U | 7/2018 |
| CN | 207718019 U | 8/2018 |
| CN | 207799180 U | 8/2018 |
| CN | 105762564 B | 1/2019 |
| CN | 109167191 A | 1/2019 |
| CN | 107884879 B | 5/2019 |
| CN | 110007405 A | 7/2019 |
| CN | 209055696 U | 7/2019 |
| CN | 209119784 U | 7/2019 |
| CN | 209132482 U | 7/2019 |
| CN | 209150423 U | 7/2019 |
| CN | 106687839 B | 8/2019 |
| CN | 110174727 A | 8/2019 |
| CN | 207650447 U | 8/2019 |
| CN | 110445085 A | 11/2019 |
| CN | 209674046 U | 11/2019 |
| CN | 209730781 U | 12/2019 |
| CN | 210038243 U | 2/2020 |
| CN | 210224915 U | 3/2020 |
| DE | 10135971 C1 | 4/2003 |
| DE | 20201210018 U1 | 5/2012 |
| EP | 1884812 A1 | 2/2008 |
| EP | 3172603 A1 | 5/2017 |
| EP | 3488278 A1 | 5/2019 |
| JP | 53025244 B2 | 9/1987 |
| JP | 2009282177 A | 12/2009 |
| JP | 2016184009 A | 10/2016 |
| KR | 1020150080667 A | 7/2015 |
| KR | 101762403 B1 | 7/2017 |
| KR | 102085172 B1 | 3/2020 |
| NL | 1037547 C2 | 3/2015 |
| TW | M493066 U | 1/2015 |
| WO | 2019178936 A1 | 9/2019 |
| WO | 2019195652 A1 | 10/2019 |
| WO | 2019239567 A1 | 12/2019 |
| WO | 2020046711 A1 | 3/2020 |
| WO | 2020048464 A1 | 3/2020 |

* cited by examiner

CABLE NODE TRANSITION ASSEMBLIES

FIELD

The present disclosure relates generally to cable node transition assemblies for connecting fiber optic cables to nodes in fiber optic networks.

BACKGROUND

Optical fiber is increasingly being used for a variety of applications, including broadband applications such as voice, video and data transmissions. Many fiber optic networks generally lead to an end user, commonly referred to as a subscriber. Fiber optic networks which provide such access are commonly referred to as FTTX "fiber to the X" networks, with X indicating a delivery point such as a premises (i.e. FTTP).

At certain locations in many fiber optic networks, a fiber optic cable will be required to enter a sealed unit, such as a junction or cable box, which in many cases is referred to as a node. Typically, the optical fibers extend into the sealed unit and will be individually terminated and/or connected as required per specific application.

However, in many cases, installation of the cable at a node, and the required connection to the sealed unit, is time-consuming and difficult. For example, known assemblies for connecting cables at such nodes are relatively large and only allow the cable to enter the node in a single direction, which is typically straight into the node. However, there may not be sufficient room available for a technician to install the cable in such manner. This can result in the technician potentially inadvertently damaging the cable during the installation process.

Accordingly, improved apparatus for installing cables at fiber optic network nodes are desired in the art. In particular, improved apparatus which allow for flexibility in the direction in which the cable is installed at the node would be advantageous.

BRIEF DESCRIPTION

Aspects and advantages of the cable node transition assemblies in accordance with the present disclosure will be set forth in part in the following description, or may be obvious from the description, or may be learned through practice of the technology.

In accordance with one embodiment, a cable node transition assembly is provided. The cable node transition assembly includes an outer nut extending along a longitudinal axis between a first end and a second end, the outer nut including an outer thread at the second end. The cable node transition assembly further includes a flexible boot extending between a first end and a second end, the flexible boot extending into the outer nut at the first end of the outer nut such that the second end of the flexible boot is disposed within the outer nut. The flexible boot is connected to the outer nut. The flexible boot is movable between a first position and a second position and fixable in each of the first position and the second position. In the first position the first end of the flexible boot is coaxial with the second end of the flexible boot along the longitudinal axis. In the second position the first end of the flexible boot is non-coaxial with the second end of the flexible boot along the longitudinal axis.

In accordance with another embodiment, a cable node transition assembly is provided. The cable node transition assembly includes an outer nut extending along a longitudinal axis between a first end and a second end, the outer nut including an outer thread at the second end. The cable node transition assembly further includes a fiber optic cable, the fiber optic cable including a jacket and a plurality of optical fibers. A second end of the jacket terminates within the outer nut. The plurality of optical fibers extend through the outer nut. The cable node transition assembly further includes a cable positioning assembly connected to the outer nut and extending from the first end of the outer nut. A portion of the cable is disposed within the cable positioning assembly. The cable positioning assembly is operable to alternately fix the cable in a first position and a second position. In the first position the portion of the cable disposed within the cable positioning assembly extends along the longitudinal axis. In the second position the portion of the cable disposed within the cable positioning assembly extends away from the longitudinal axis.

These and other features, aspects and advantages of the present cable node transition assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF FIGURES

A full and enabling disclosure of the present cable node transition assemblies, including the best mode of making and using the present systems and methods, directed to one of ordinary skill in the art, is set forth in the specification, which makes reference to the appended figures, in which.

DETAILED DESCRIPTION

Figure 1:
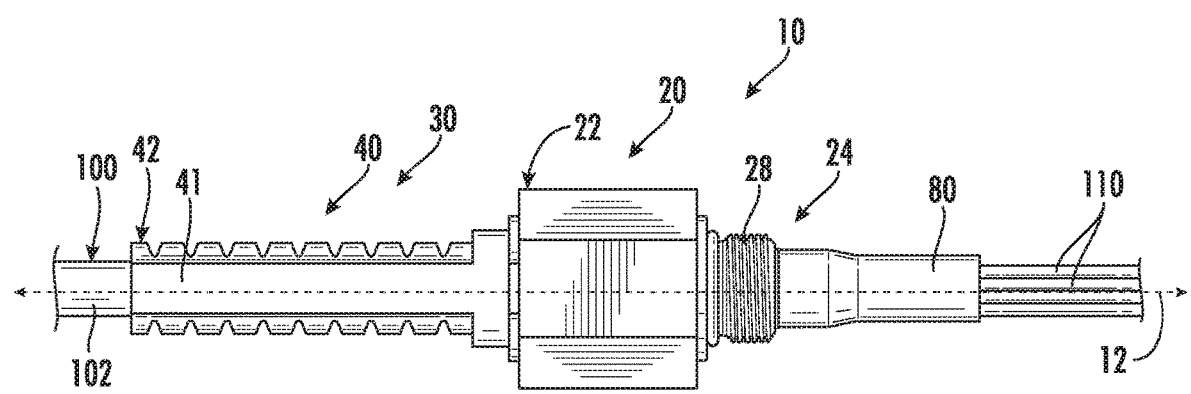
FIG. 1 is a side view of a cable node transition assembly in a first position in accordance with embodiments of the present disclosure.
Figure 2:
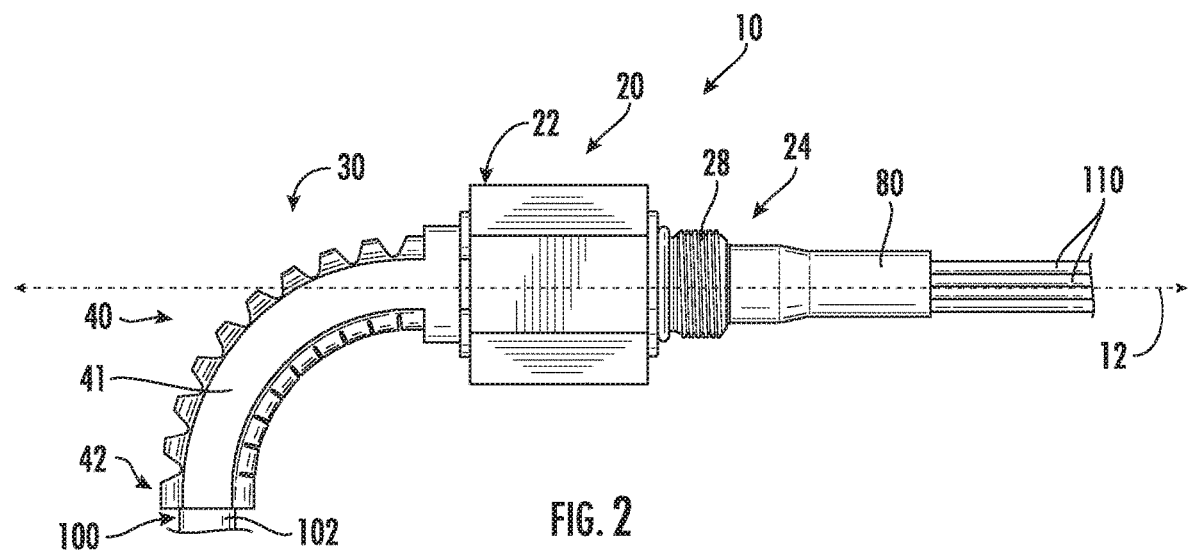
FIG. 2 is a side view of a cable node transition assembly in a second position in accordance with embodiments of the present disclosure.
Figure 3:
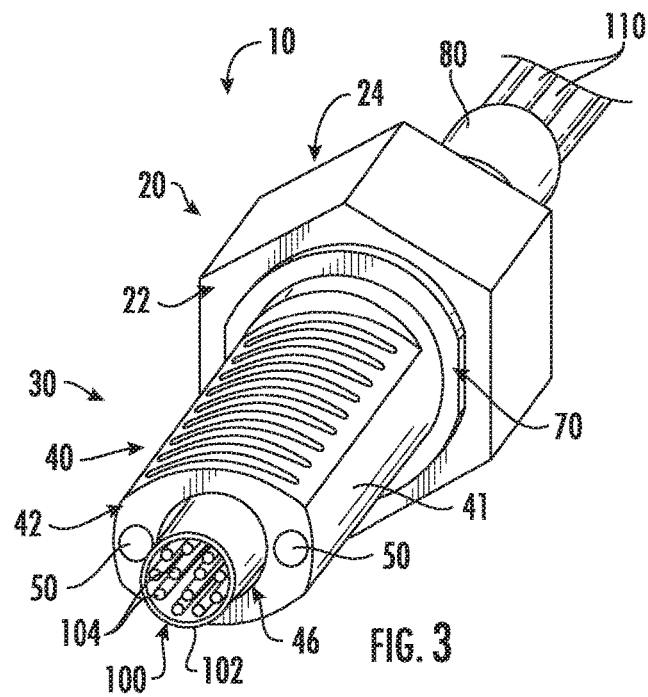
FIG. 3 is a perspective view of a cable node transition assembly in accordance with embodiments of the present disclosure.
Figure 4:
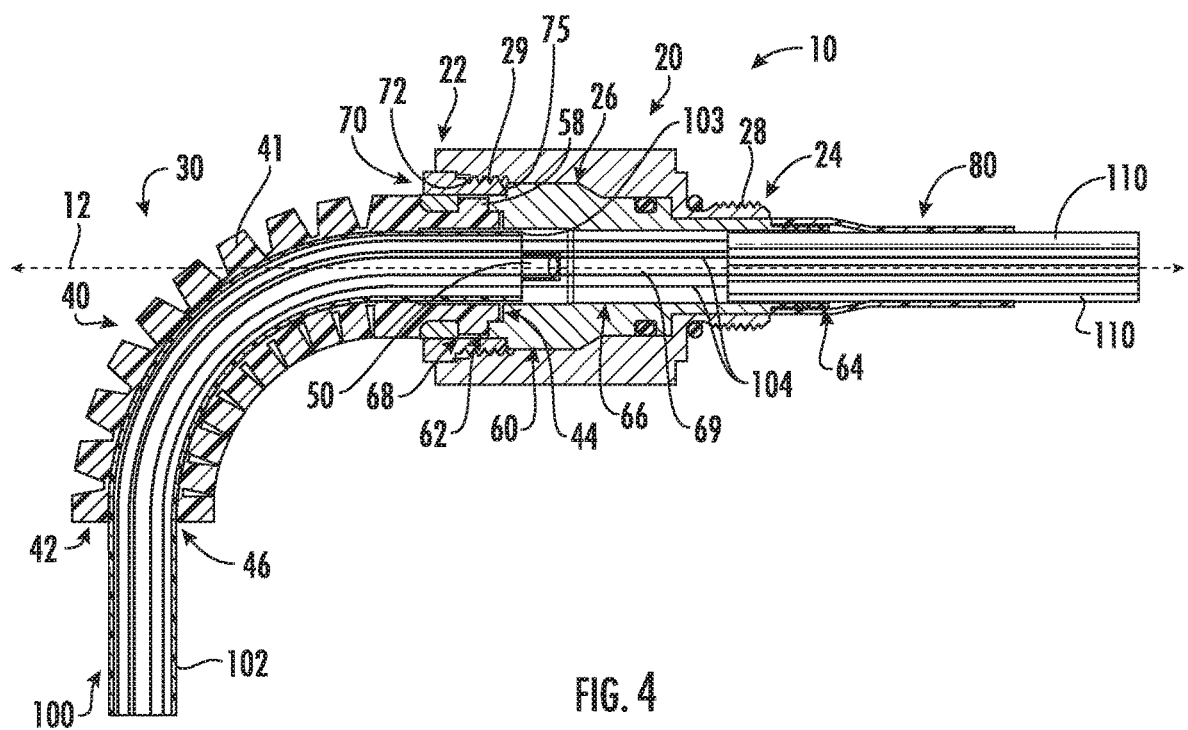
FIG. 4 is a cross-sectional view of a cable node transition assembly in accordance with embodiments of the present disclosure.
Figure 5:
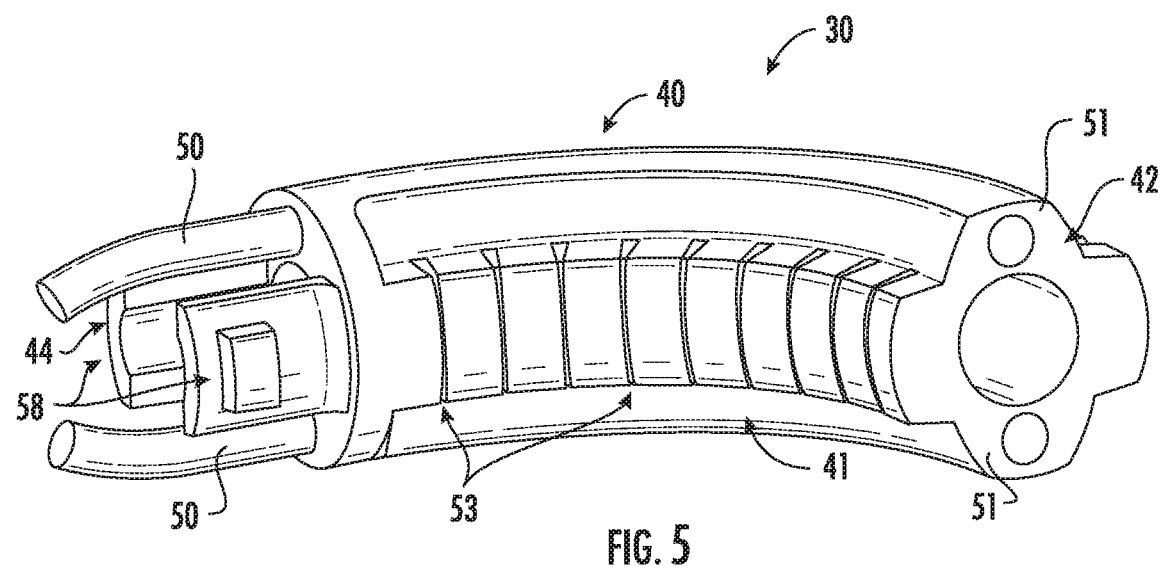
FIG. 5 is a perspective view of a flexible boot of a cable node transition assembly in accordance with embodiments of the present disclosure.
Figure 6:
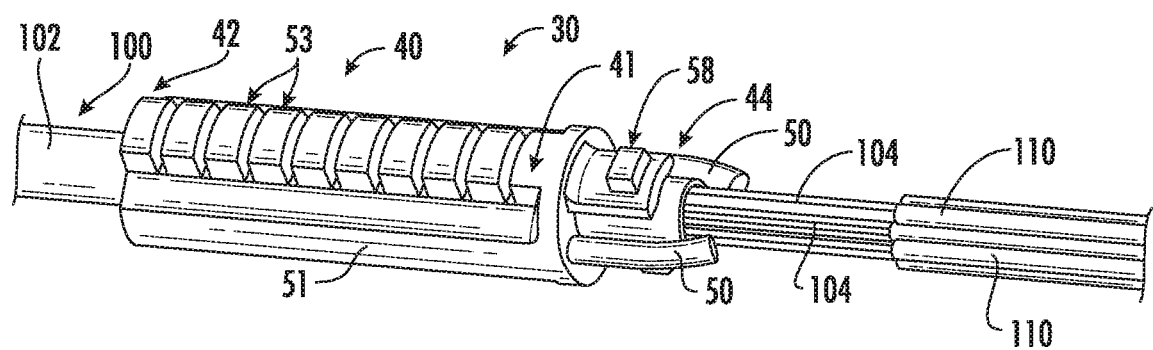
FIG. 6 is a perspective view of a cable, furcation tubes, and flexible boot of a cable node transition assembly in accordance with embodiments of the present disclosure.

Reference now will be made in detail to embodiments of the present cable node transition assemblies, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to FIGS. 1 through 10, various embodiments of cable node transition assemblies 10 in accordance with the present disclosure are provided. Cable node transition assemblies 10 in accordance with the present disclosure advantageously provide significant improvements with regard to cable node installation procedures. For example, cable node transition assemblies 10 allow for flexibility in the orientation of the cable and assembly relative to the cable node, thus allowing for efficient installation in limited spaces. The cable node transition assembly 10 can advantageously be adjusted as necessary before, during, and/or after the installation, as is required for a specific application. Additionally, cable node transition assemblies 10 advantageously reduce or prevent the risk of cable damage due to over-bending. For example, cable node transition assemblies 10, and the cable positioning assemblies thereof as discussed herein, include features which limit bending and thus restrict the bend radius of the cable while still allowing flexibility in the positioning of the cable. Accordingly, cable node transition assemblies 10 in accordance with the present disclosure further allow associated cables (and optical fibers thereof) to maintain their optical characteristics during and after installation thereof.

Cable node transition assembly 10 may include or be utilized with a fiber optic cable 100. Fiber optic cable 100 may include a jacket 102 and a plurality of optical fibers 104. Jacket 102 may surround and contain at least a portion of each of the plurality of optical fibers 104. Jacket 102 may, for example, extend between a first end (not shown) and a second end 103 which may, as discussed herein, terminate within the cable node transition assembly 10. Optical fibers 104 may protrude and extend from the jacket 102 at the second end 103. Cable 100 may additionally include strength members (such as aramid fibers, etc.) which may be at least partially surrounded by the jacket 102 and which may protrude and extend from the jacket 102 at the second end 103.

Cable node assembly 10 may include an outer nut 20. The outer nut 20 may connect to a node to, for example provide a sealed connection at the node. Outer nut 20 extends along a longitudinal axis 12 between a first end 22 and a second end 24. A passage 26 may be defined through the outer nut 20. Passage 26 may extend through the first end 22 and second end 24 and extend along the longitudinal axis 12.

Outer nut 20 may further include an outer thread 28, which may be provided on an exterior surface of the outer nut 20 at the second end 24. The outer thread 28 may engage an inner thread at the node to facilitate the node connection. In some embodiments, an outer diameter of the outer nut 20 at the thread 28 and second end 24 may be different from, such as less than, an outer diameter of the outer nut 20 at the first end 22. Alternatively, the outer diameters may be the same.

The cable 100 may extend into and through the outer nut 20. For example, the jacket 102 may extend into the outer nut 20, such as the passage 26 thereof, through the first end 22. The second end 103 of the jacket 102 may terminate within the outer nut 20, such as within the passage 26. Optical fibers 104 may extend into the outer nut 20, such as the passage 26 thereof, through the first end 22. Optical fibers 104 may further protrude and extend from the second end 103 within the outer nut 20, such as the passage 26 thereof, and may extend from the outer nut 20, such as the passage 26 thereof, through the second end 24. Outer nut 20 may be rotatable, such as about the longitudinal axis 12, relative to the cable 100.

Cable node assembly 10 may further include a cable positioning assembly 30. Cable positioning assembly 30 may be connected to the outer nut 20, and may be movable (such as rotatable about the longitudinal axis 12) relative to the outer nut 20. Outer nut 20 may thus be rotatable, such as about the longitudinal axis 12, relative to the cable positioning assembly 30. Cable positioning assembly 30 may extend from the first end 22 of the outer nut 20. A portion of the cable 100, such as a portion of the cable 100 extending from the first end 22, may be disposed within the cable positioning assembly 30. The portion of the cable 100 disposed within the cable positioning assembly 30 may include jacket 102 and optical fibers 104. The cable positioning assembly 30 may facilitate movement and positioning of the cable 100 in a variety of positions, such as at least in a first position and a second position as discussed herein. Accordingly, the cable positioning assembly 30 may be operable to alternately fix the cable 100 in various positions, such as a first position and a second position which is different from the first position.

Figure 7:
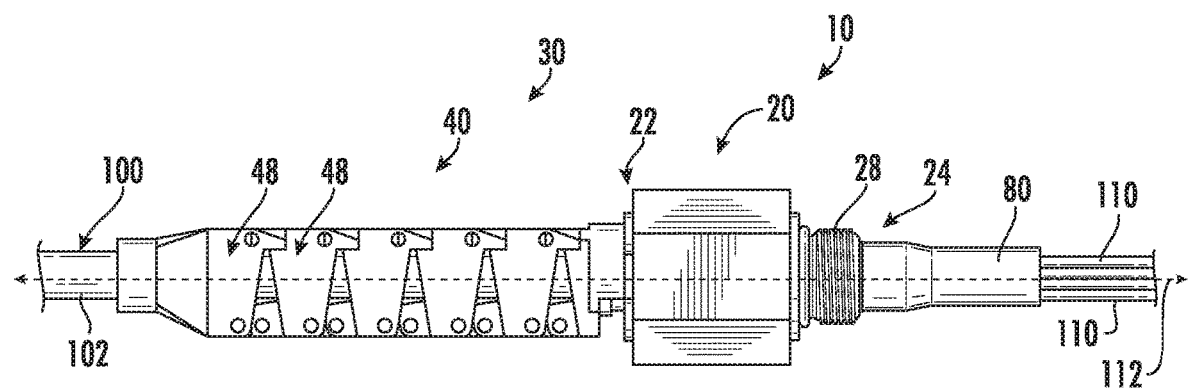
FIG. 7 is a side view of a cable node transition assembly in a first position in accordance with other embodiments of the present disclosure.
Figure 8:
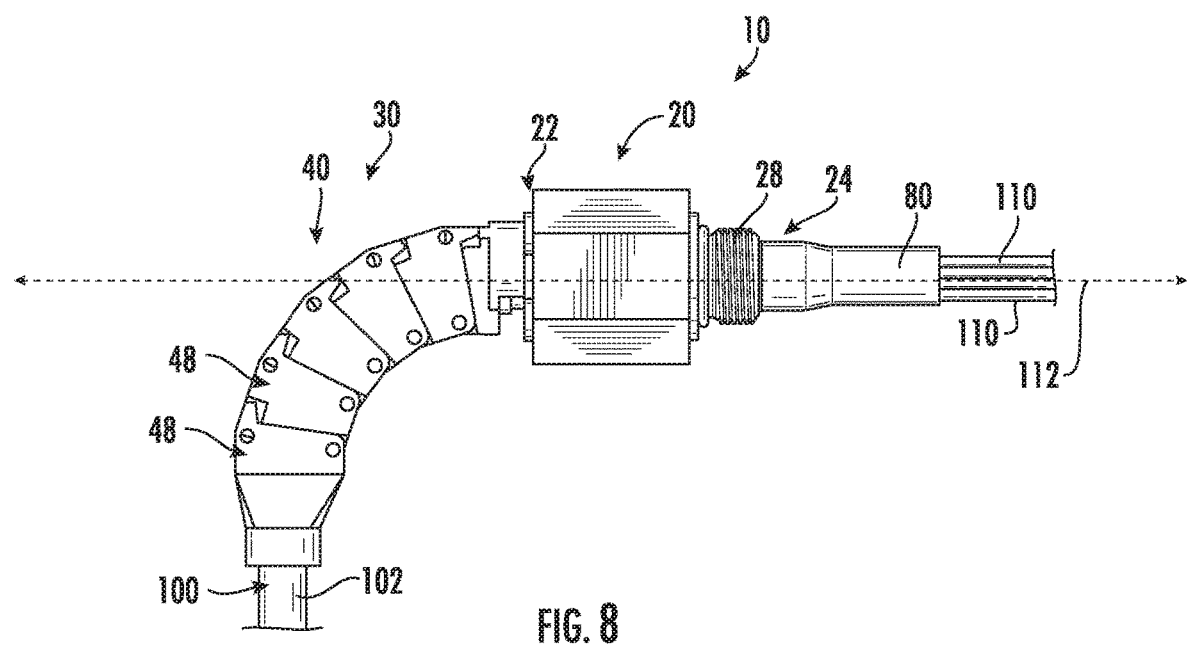
FIG. 8 is a side view of a cable node transition assembly in a second position in accordance with other embodiments of the present disclosure.
Figure 9:
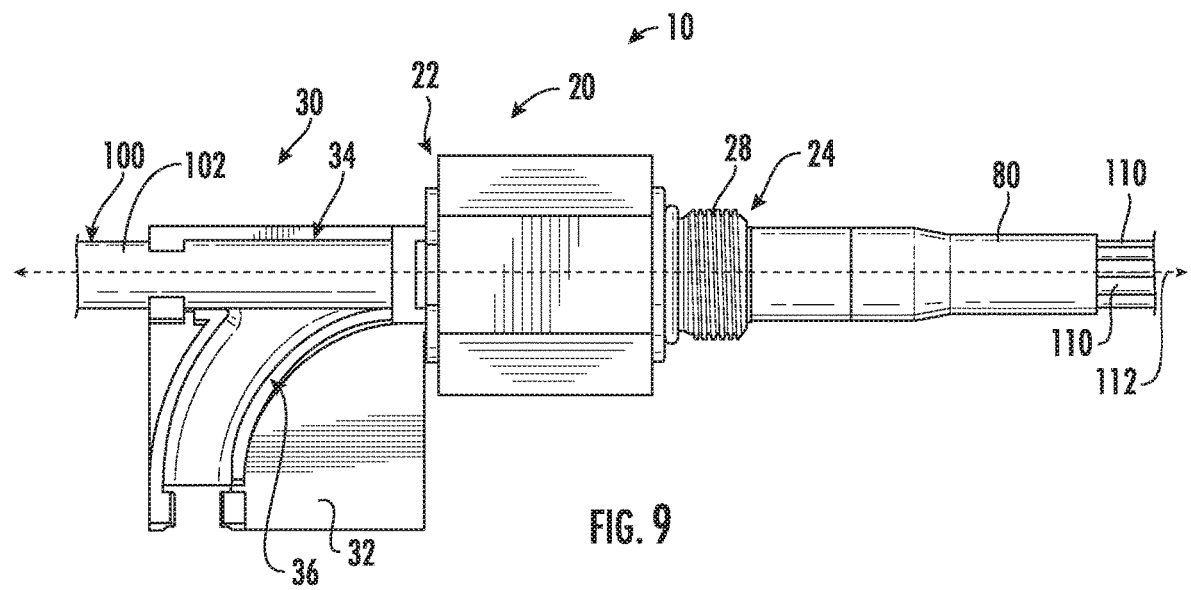
FIG. 9 is a side view of a cable node transition assembly in a first position in accordance with still other embodiments of the present disclosure.

Cable positioning assemblies 30 in first positions are illustrated in FIGS. 1, 7, and 9. Cable positioning assemblies 30 in second positions are illustrated in FIGS. 2, 4, 8, and 10. In the first position, the portion of the cable 100 disposed within the cable positioning assembly 30 extends along the longitudinal axis 12, as shown. In the second position, the portion of the cable 100 disposed within the cable positioning assembly 30 extends away from the longitudinal axis 12, as shown. For example, the portion of the cable 100 may curve away from the longitudinal axis 12, such as in some embodiments to perpendicular with the longitudinal axis 12.

Figure 10:
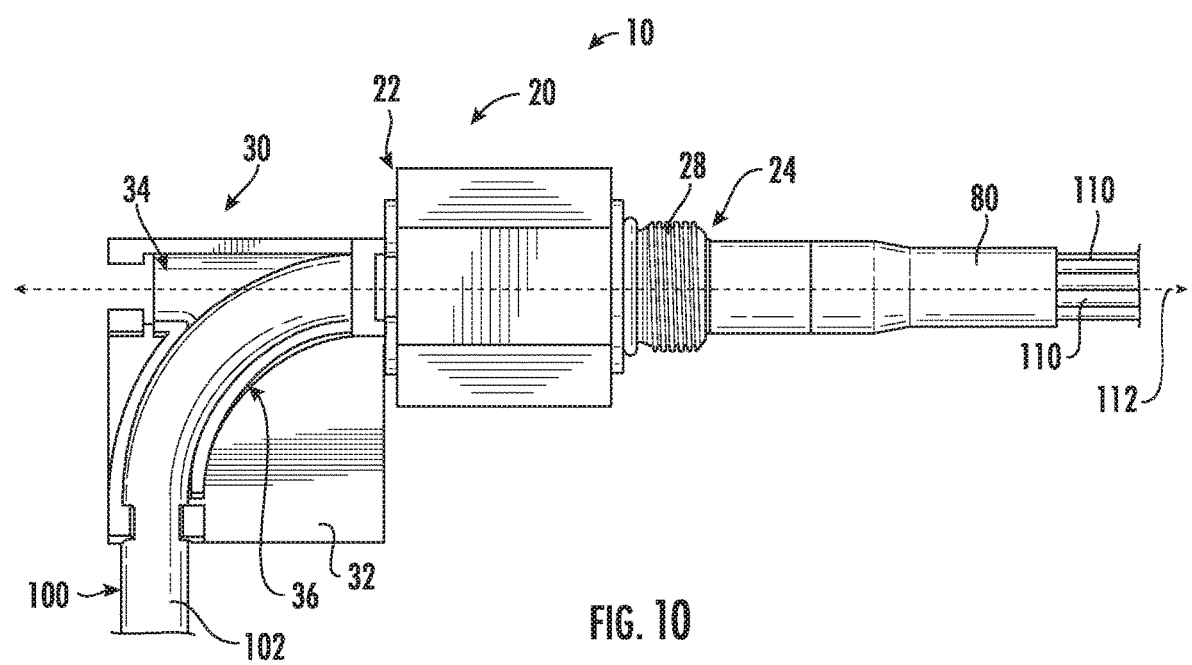
FIG. 10 is a side view of a cable node transition assembly in a second position in accordance with still other embodiments of the present disclosure.

In some embodiments, as illustrated in FIGS. 9 and 10, the cable positioning assembly 30 includes a plate 32 which defines at least a first cable path 34 and a second cable path 36 different from the first cable path. Plate 32 may be connected to the outer nut 20, and may be movable (such as rotatable about the longitudinal axis 12) relative to the outer nut 20. Plate 32 may extend from the first end 22 of the outer nut 20. The first cable path 34 may position the cable 100 in the first position, and the second cable path 36 may position the cable 100 in the second position. The portion of the cable 100 may be alternately disposed and fixed in the first cable path 34, and thus in the first position, or in the second cable path 36, and thus in the second position.

In other embodiments, as illustrated in FIGS. 1 through 8, the cable positioning assembly 30 includes a flexible boot 40. The flexible boot 40 is generally a bendable casing which surrounds and protects the portion of the cable 100. Flexible boot 40 may be connected to the outer nut 20, and may be movable (such as rotatable about the longitudinal axis 12) relative to the outer nut 20. Flexible boot 40 may extend from the first end 22 of the outer nut 20.

In some embodiments, as illustrated in FIGS. 1 through 6, flexible boot 40 may be a single, flexible component. In these embodiments, flexible boot 40 may, for example, be formed from a suitably flexible material, such as a thermoplastic elastomer. Flexible boot 40 may, for example, comprise a body 41 and extend between a first end 42 and a second end 44. Second end 44 may be disposed within the outer nut 20, such as the passage 26 thereof. First end 42 may be external to the outer nut 20.

A passage 46 may be defined through the flexible boot 40 and body 41 thereof. Passage 46 may extend through the first end 42 and second end 44. The portion of the cable 100 may extend through the flexible boot 40, such as through the passage 46 thereof. Cable 100 (such as jacket 102 and optical fibers 104) may extend from the first end 42. Optical fibers 104 may extend from the second end 44. In exemplary embodiments, jacket 102 may also extend from second end 44, such that the second end 103 is external to the boot 40 (while internal to the outer nut 20, such as in the passage 26 thereof).

In other embodiments, as illustrated in FIGS. 7 and 8, flexible boot 40 may be formed from a plurality of connected linkages 48. The linkages 48 may be movably connected to each other such that each linkage 48 can move relative to neighboring linkages 48 connected thereto, such that the boot 40 is bendable. Flexible boot 40 may extend through linkages 48 between first end 42 and second end 44. Second end 44 may be disposed within the outer nut 20, such as the passage 26 thereof. First end 42 may be external to the outer nut 20.

Passage 46 may be defined through the flexible boot 40 and linkages 48. Passage 46 may extend through the first end 42 and second end 44. The portion of the cable 100 may extend through the flexible boot 40, such as through the passage 46 thereof. Cable 100 (such as jacket 102 and optical fibers 104) may extend from the first end 42. Optical fibers 104 may extend from the second end 44. In exemplary embodiments, jacket 102 may also extend from second end 44, such that the second end 103 is external to the boot 40 (while internal to the outer nut 20, such as in the passage 26 thereof).

Referring again to FIGS. 1 through 8, the flexible boot 40 is movable between a variety of positions, such as a first position (see FIGS. 1 and 7) and a second position (see FIGS. 1, 4, and 8) which is different from the first position. Further, the flexible boot 40 is fixable in each of the various positions, such as the first position and the second position. Accordingly, the portion of the cable 100 within the flexible boot 40 may be alternately fixed in such positions, such as the first position and the second position.

In the first position, for example, the first end 42 of the flexible boot 40 may be coaxial with the second end 44 of the flexible boot 40 along the longitudinal axis 12. The flexible boot 40 may, for example, extend linearly between the first end 42 and second end 44. In the first position, the portion of the cable 100 disposed within the flexible boot 40 may thus extend along the longitudinal axis 12. In the second position, for example, the first end 42 of the flexible boot 40 may be non-coaxial with the second end 44 of the flexible boot 40 along the longitudinal axis 12. For example, the first end 42 in some embodiments may be perpendicular to the second end 44. The flexible boot 40 may, for example, extend curvilinearly between the first end 42 and second end 44. In the second position, the portion of the cable 100 disposed within the flexible boot 40 may thus extend away from the longitudinal axis 12. For example, the portion of the cable 100 may curve away from the longitudinal axis 12, such as in some embodiments to perpendicular with the longitudinal axis 12.

As discussed, the flexible boot 40 (and the associated portion of the cable 100) may be alternately fixed in the various positions, such as in the first position and the second position. In embodiments wherein linkages 48 are utilized. The linkages 48 may move to various positions and then be fixed in those positions relative to neighboring linkages, thus facilitating such fixation of the flexible boot 40 generally and cable 100 in the various positions. In embodiments wherein the flexible boot is a singular body 41, one or more stiffener wires 50 may be embedded in the body 41. The stiffener wires 50 may deform to the various positions, but may fix in such positions (e.g. be plastically deformable as opposed to the elastic deformability of the body 41) and may thus fix the body 41 and boot 40 generally in such positions.

In exemplary embodiments, two stiffener wires 50 may be embedded in the body 41. For example, body 41 may include opposing wings 51 in which the stiffener wires 50 are embedded. Cutouts 53 defined in the body 41 may, for example, be defined between the wings 51, such that movement (e.g. bending) of the boot 40 is encouraged in certain directions but not others.

In some embodiments, the stiffener wires 50 may have circular cross-sectional profiles. Alternatively, the cross-sectional profiles may be oval, rectangular, or have other suitable shapes.

In exemplary embodiments, the stiffener wires 50 may protrude from the flexible boot 40, such as from the body 41 thereof. For example, the stiffener wires 50 may protrude from the second end 44. Accordingly, ends of the stiffener wires 50 may be external to the body 41 but disposed internally in the outer nut 20, such as the passage 26 thereof.

As discussed, the cable positioning assembly 30, such as the plate 32 or flexible boot 40, may be connected to the outer nut 20. Further, the cable positioning assembly 30, such as the plate 32 or flexible boot 40, may be movable (such as rotatable about the longitudinal axis 12) relative to the outer nut 20. Various additional components of the cable node assembly 10 may facilitate such connection and movement.

For example, cable node assembly 10 may include a core 60 which is disposed within the outer nut 20, such as in the passage 26 thereof. Core 60 may extend between a first end 62 and a second end 64, and a passage 66 may be defined through the core 60, including through the first end 62 and second end 64. First end 62 may be disposed within the passage 26. Second end 64 may protrude from the second end 24 and thus be external to the outer nut 20. The core 60 may be rotatable about the longitudinal axis 12 relative to the outer nut 20, and the outer nut 20 in turn rotatable about the longitudinal axis 12 relative to the core 60.

Core 60 may be connected to the cable positioning assembly 30, such as the plate 32 or flexible boot 40, and may thus provide the connection to the outer nut 20 by being disposed within the outer nut 20. For example, in embodiments wherein the flexible boot 40 is utilized, tabs 58 of the boot 40 (which may be provided at the second end 44 thereof) may be inserted into slots 68 defined in the core 60 (such as at the first end 62 thereof) to connect the flexible boot 40 (e.g. at the second end 44 thereof) and core 60 (e.g. at the first end thereof) together.

As discussed, the second end 103 of the jacket 102 may terminate in the outer nut 20, and the optical fibers 104 may extend through the outer nut 20. Further, ends of stiffener wires 50 may be disposed in outer nut 20. In exemplary embodiments, the second end 103 of the jacket 102 may terminate in the core 60, such as the passage 66 thereof, and the optical fibers 104 may extend through the core 60, such as the passage 66 thereof. Further, in exemplary embodiments, the ends of the stiffener wires 50 may be disposed in the core 60, such as the passage 66 thereof.

In exemplary embodiments, a filler 69 may be provided in the core 60, such as in the passage 66 thereof. In exemplary embodiments, the filler 69 may be a potting material such as an epoxy. Filler 69 may surround and capture the second end 103, the portions of the optical fiber 104, the stiffener wires 50 ends, etc. disposed in the passage 66 and thus solidify the connections of the various components as discussed herein.

Cable node transition assembly 10 may further include an inner nut 70 disposed within the outer nut 20, such as in the passage 26 thereof. Inner nut 70 may engage with outer nut 20 to capture the core 60 and cable positioning assembly 30, such as the plate 32 or flexible boot 40, in the passage 26 and thus further connect the cable positioning assembly 30, such as the plate 32 or flexible boot 40, and the outer core 20. For example, outer nut 20 may further include an inner thread 29 at the first end 22 thereof, such as in the passage 26. Inner nut 70 may include an outer thread 72 engageable with the inner thread 29. Inner nut 70 may further surround the core 60, such as in some embodiments the slot 68 thereof, and may further surround the cable positioning assembly 30, such as the plate 32 or flexible boot 40, such as the second end 44 and in some embodiments tabs 58 thereof. Further, inner nut 70 may, for example, contact a shoulder 75 of the core 60. Accordingly, core 60 may be captured within outer nut 20 by inner nut 70, and cable positioning assembly 30 may additionally be so captured. In exemplary embodiments, core 60 and cable positioning assembly 30, such as the plate 32 or flexible boot 40, may be rotatable about the longitudinal axis 12 relative to the inner nut 70.

As discussed, optical fibers 104 may extend from the second end 24 of the outer nut 20. In some embodiments, a plurality of furcation tubes 110 may be provided. Each furcation tube 110 may surround one of the plurality of optical fibers 104 as the optical fiber 104 extends from the second end 24. The furcation tubes 110 may extend into the outer nut 20, such as the passage 26 thereof, through the second end 24, and may thus extend from the second end 24 as shown. Furcation tubes 110 may thus protect the optical fibers 104 which are exiting the outer nut 20 and assembly 10 generally.

In some embodiments, a transition tube 80 may extend from the second end 24 of the outer nut 20. Transition tube 80 may, for example, be connected to and surround the second end 64 of the core 60. Transition tube 80 may surround the optical fibers 104 and furcation tubes 110 which extend from the second end 24 of the outer nut 20, thus providing a transition and added protection to the optical fibers 104 which are exiting the outer nut 20 and assembly 10 generally.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A cable node transition assembly, comprising:
    an outer nut extending along a longitudinal axis between a first end and a second end, the outer nut comprising an outer thread at the second end and an inner thread at the first end; and
    a flexible boot extending between a first end and a second end, the flexible boot extending into the outer nut at the first end of the outer nut such that the second end of the flexible boot is disposed within the outer nut, the flexible boot connected to the outer nut, the flexible boot movable between a first position and a second position and fixable in each of the first position and the second position, wherein in the first position the first end of the flexible boot is coaxial with the second end of the flexible boot along the longitudinal axis, and wherein in the second position the first end of the flexible boot is non-coaxial with the second end of the flexible boot along the longitudinal axis;
    a core disposed within the outer nut and connected to the flexible boot at the second end of the flexible boot, the core rotatable about the longitudinal axis relative to the outer nut; and
    an inner nut disposed within the outer nut, the inner nut comprising an outer thread engageable with the inner thread of the outer nut, the inner nut surrounding the core and the second end of the flexible boot.

2. The cable node transition assembly of claim 1, wherein the flexible boot comprises a body defining a passage and further comprises at least one stiffener wire embedded in the body.

3. The cable node transition assembly of claim 2, wherein the stiffener wire protrudes from the flexible boot at the second end of the flexible boot.

4. The cable node transition assembly of claim 1, wherein the flexible boot comprises a plurality of connected linkages.

5. The cable node transition assembly of claim 1, wherein the core is rotatable about the longitudinal axis relative to the inner nut.

6. The cable node transition assembly of claim 1, further comprising a transition tube extending from the second end of the outer nut.

7. The cable node transition assembly of claim 1, further comprising an epoxy filler within the core.

8. The cable node transition assembly of claim 1, further comprising a fiber optic cable, the fiber optic cable comprising a jacket and a plurality of optical fibers, the cable extending through the flexible boot, a second end of the jacket terminating within the outer nut, and the plurality of optical fibers extending through the outer nut.

9. The cable node transition assembly of claim 8, further comprising a plurality of furcation tubes, each of the plurality of furcation tubes surrounding one of the plurality of optical fibers and extending from the second end of the outer nut.

10. A cable node transition assembly, comprising:
    an outer nut extending along a longitudinal axis between a first end and a second end, the outer nut comprising an outer thread at the second end and an inner thread at the first end; and
    a fiber optic cable, the fiber optic cable comprising a jacket and a plurality of optical fibers, a second end of the jacket terminating within the outer nut, the plurality of optical fibers extending through the outer nut; and a cable positioning assembly connected to the outer nut and extending from the first end of the outer nut, wherein a portion of the fiber optic cable is disposed within the cable positioning assembly, the cable positioning assembly operable to alternately fix the fiber optic cable in a first position and a second position, wherein in the first position the portion of the fiber optic cable disposed within the cable positioning assembly extends along the longitudinal axis, and wherein in the second position the portion of the fiber optic cable disposed within the cable positioning assembly extends away from the longitudinal axis;

a core disposed within the outer nut and connected to the cable positioning assembly, the core rotatable about the longitudinal axis relative to the outer nut; and an inner nut disposed within the outer nut, the inner nut comprising an outer thread engageable with the inner thread of the outer nut, the inner nut surrounding the core.

11. The cable node transition assembly of claim 10, wherein the cable positioning assembly comprises a plate defining a first cable path and a second cable path.

12. The cable node transition assembly of claim 10, wherein the cable positioning assembly comprises a flexible boot.

13. The cable node transition assembly of claim 12, wherein the flexible boot comprises a body defining a passage and further comprises at least one stiffener wire embedded in the body.

14. The cable node transition assembly of claim 13, wherein the stiffener wire protrudes from the flexible boot at a second end of the flexible boot.

15. The cable node transition assembly of claim 12, wherein the flexible boot comprises a plurality of connected linkages.

16. The cable node transition assembly of claim 10, further comprising a transition tube extending from the second end of the outer nut.

17. A cable node transition assembly, comprising:

an outer nut extending along a longitudinal axis between a first end and a second end, the outer nut comprising an outer thread at the second end; and a fiber optic cable, the fiber optic cable comprising a jacket and a plurality of optical fibers, a second end of the jacket terminating within the outer nut, the plurality of optical fibers extending through the outer nut; and a cable positioning assembly connected to the outer nut and extending from the first end of the outer nut, wherein a portion of the fiber optic cable is disposed within the cable positioning assembly, the cable positioning assembly operable to alternately fix the fiber optic cable in a first position and a second position, wherein in the first position the portion of the fiber optic cable disposed within the cable positioning assembly extends along the longitudinal axis, and wherein in the second position the portion of the fiber optic cable disposed within the cable positioning assembly extends away from the longitudinal axis;

wherein the cable positioning assembly comprises a plate defining a first cable path and a second cable path.

\* \* \* \* \*